July 6, 1965   N. F. PUTNAM   3,193,105
CONTINUOUS DISC FILTER
Filed Feb. 6, 1961   6 Sheets-Sheet 1

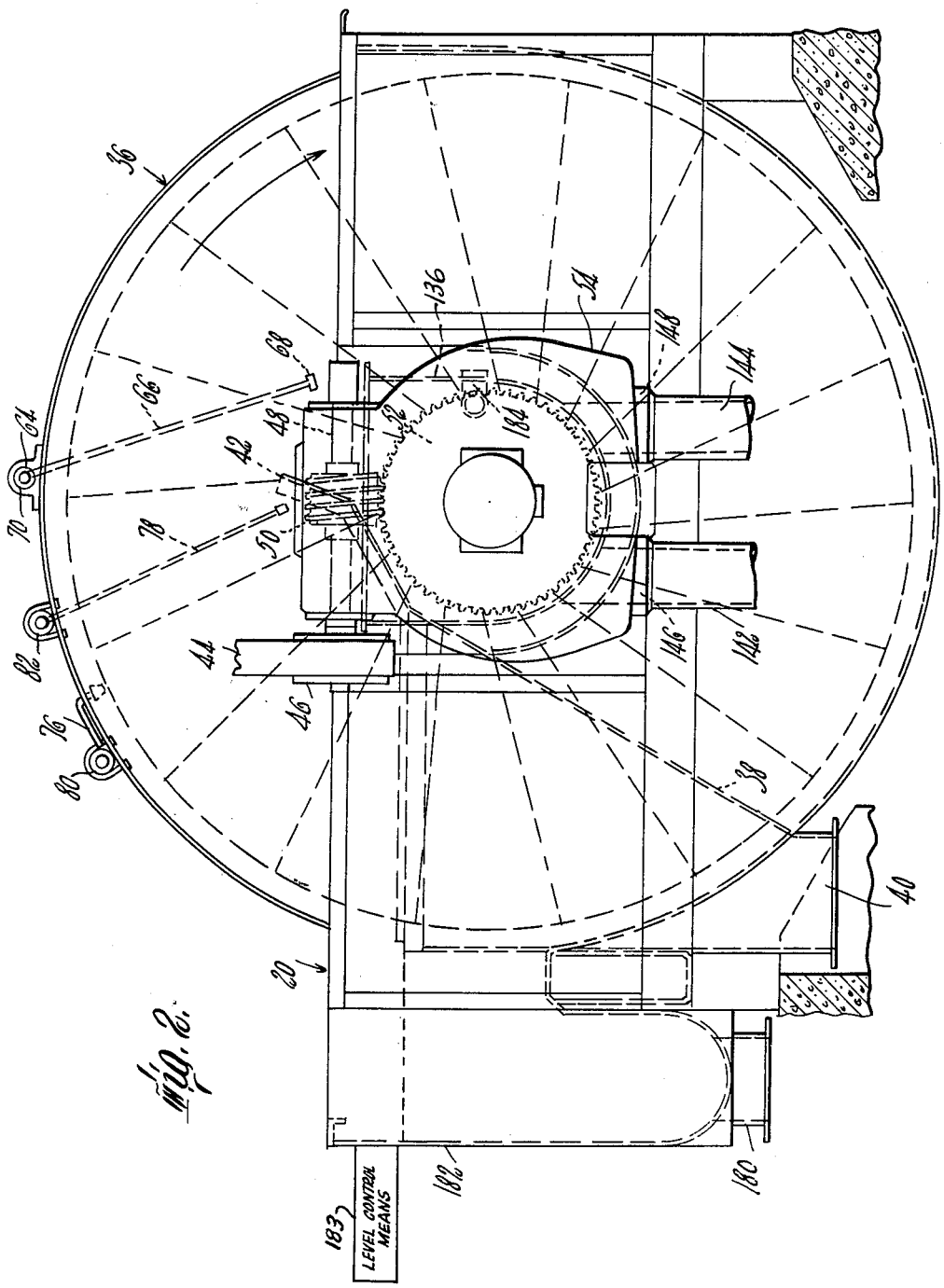

July 6, 1965
N. F. PUTNAM
3,193,105
CONTINUOUS DISC FILTER
Filed Feb. 6, 1961
6 Sheets-Sheet 3
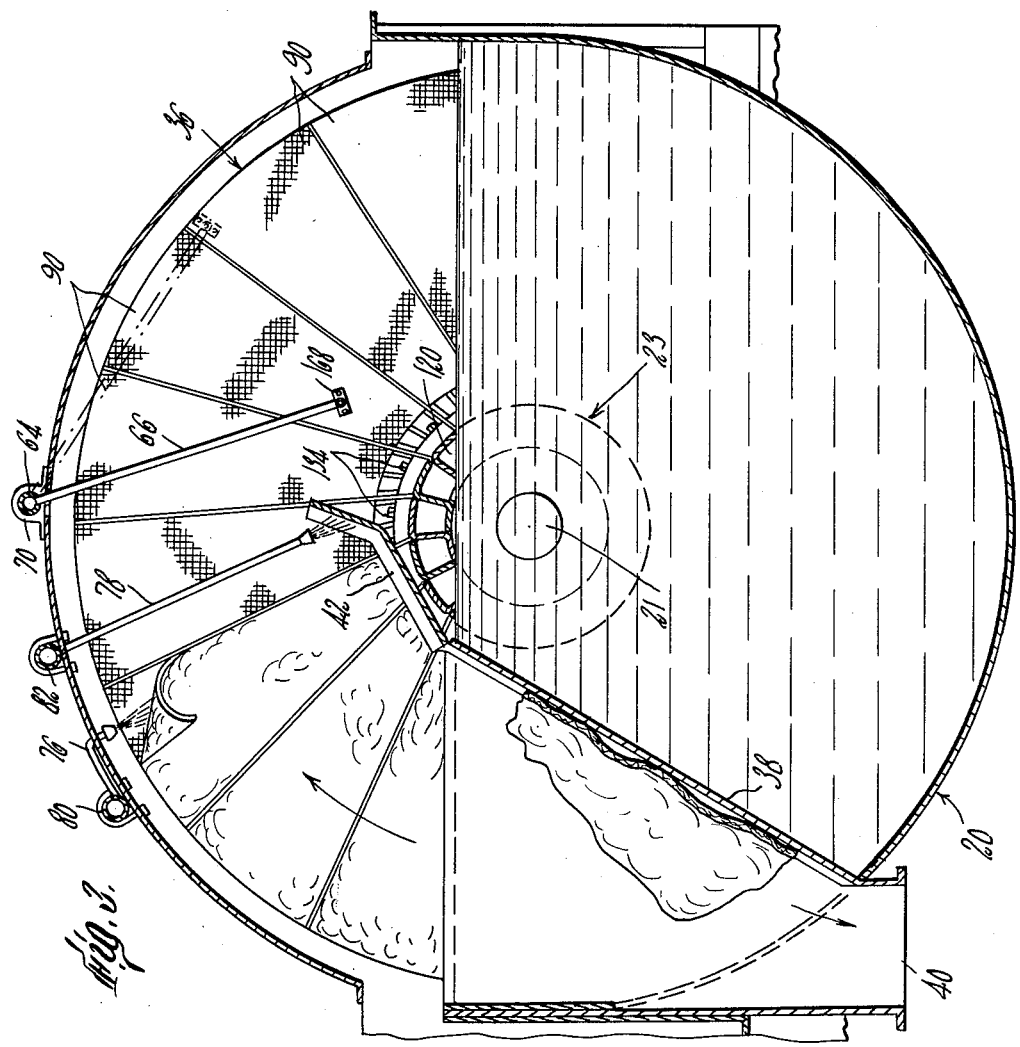
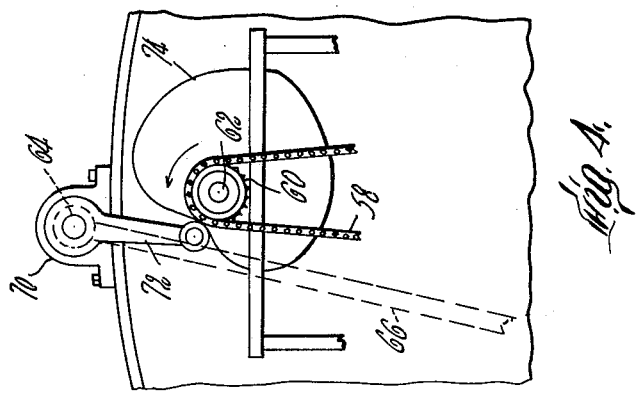

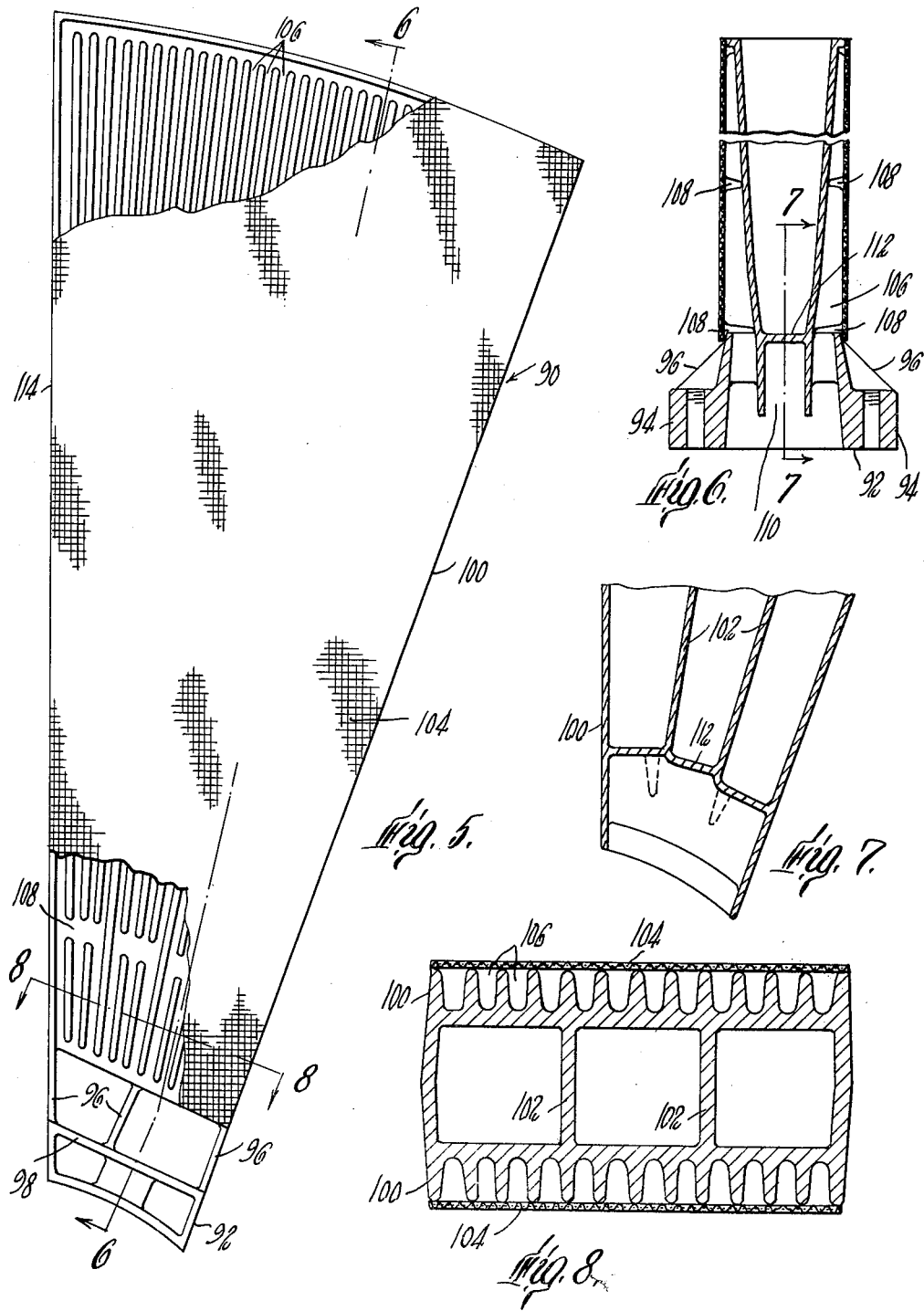

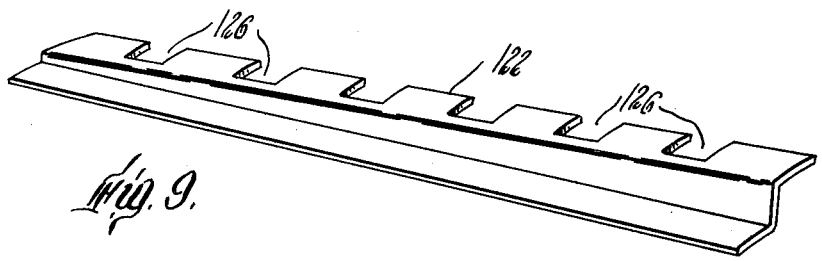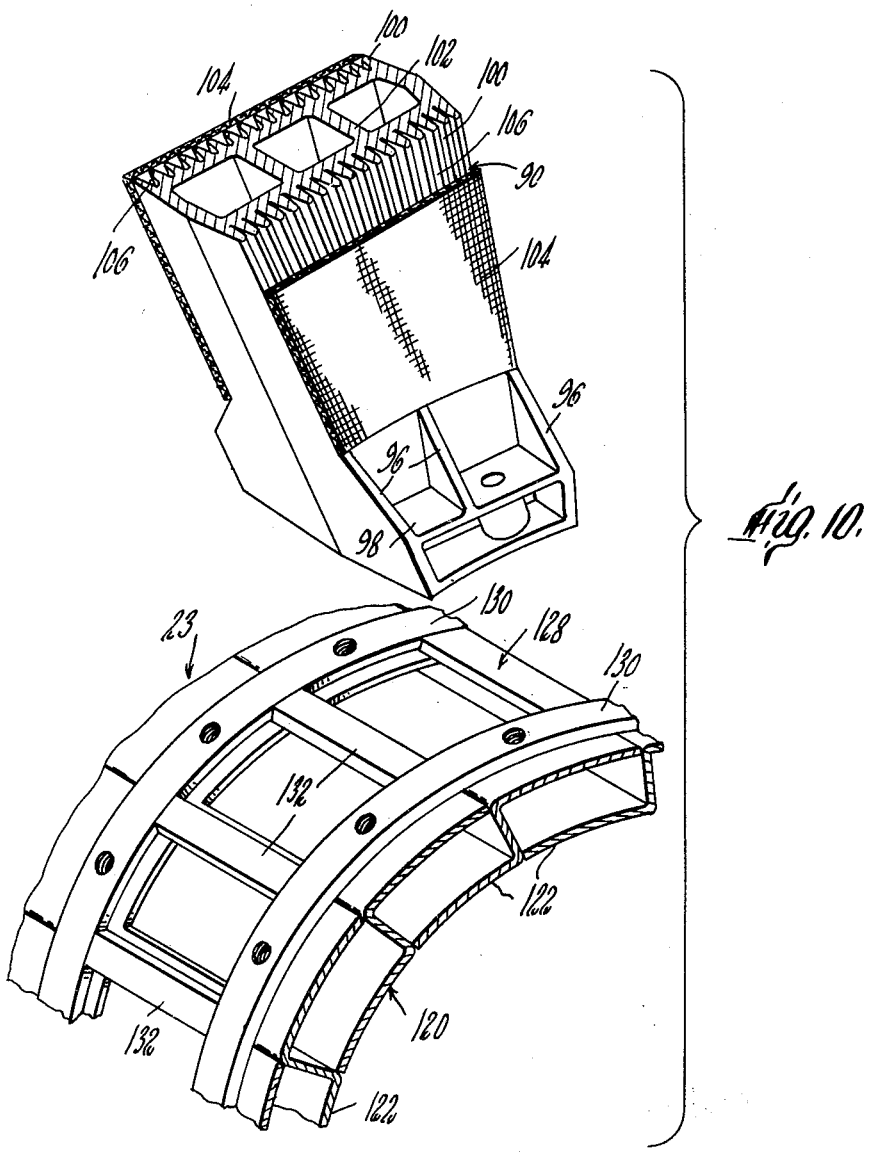

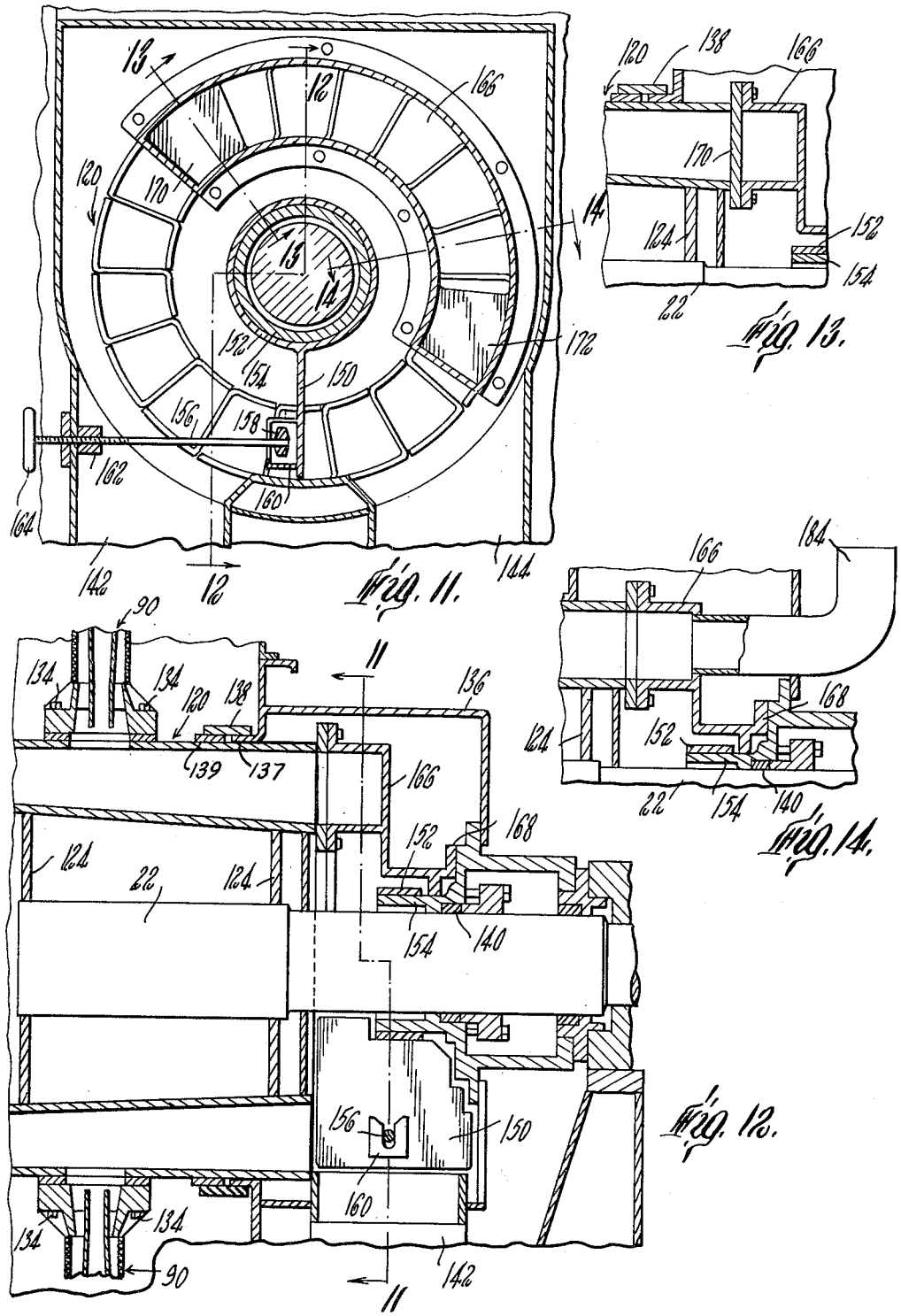

United States Patent Office 3,193,105
Patented July 6, 1965

3,193,105
CONTINUOUS DISC FILTER
Neil F. Putnam, Nashua, N.H., assignor to Improved Machinery Inc., Nashua, N.H., a corporation of Delaware
Filed Feb. 6, 1961, Ser. No. 87,158
8 Claims. (Cl. 210—331)

The present invention relates to improvements in continuous disc filters.

The invention is herein disclosed as embodied in a disc filter of the general type which comprises with a slurry containing bath, a disc filter assembly rotatably supported with relation to said bath, comprising a core adapted to rotate on a horizontal axis, and a plurality of sectioned disc filters spaced along said core. Each filter section comprises two oppositely facing suction surfaces covered by filtered screens onto which the filter cake is deposited by an air suction applied while the filter section is passing through the slurry bath, the deposited layer being subsequently stripped from the screens when the filter section, during continued rotation of the filter disc assembly, emerges from the bath.

A disc filter of the type described is conventionally provided with a series of discharge conduits which extend along the length of the core each being connected at the station of each sectioned disc filter unit to a designated filter section which occupies the same angular position for each said disc filter unit. The discharge conduits are connected to an exhaust manifold located at one end of the slurry bath.

The manifold referred to embodies therein means operative selectively to apply a suction to, and to open to atmosphere each of said exhaust conduits and filter sections associated therewith.

It is a principal object of the present invention to provide an improved continuous disc filter suitable for use, by way of example, in a paper making process, which is of simple and improved construction, is resistant to the corrosive action of the chemicals in the slurry bath, and operates with a higher degree of efficiency than comparable disc filters known in the prior art to separate out the filtrate from the solid components of the slurry produced, for example, in a paper making process.

Novel features of my improved apparatus include an improved construction and arrangement of the filter disc assembly in which each of the individual filter sections which make up each disc filter unit has the following edge thereof in the direction of rotation of the filter assembly disposed along a straight line which extends outwardly and is swept backwardly from the radial, starting at the point of emergence or attachment of the filter disc section with the periphery of the core shaft assembly. The arrangement is such that the trailing edge of the filter disc section arrives at a horizontal position when leaving the bath at a point substantially above a horizontal plane through the axis of rotation of the disc filter assembly. For this reason the depth of the bath may be increased to this higher level, and the percentage of each revolution of the disc filter during which suction may be applied to effect the deposit of the filter cake on the filter screens may be correspondingly increased.

In the preferred embodiment of the invention shown, each individual disc filter section is made from a plastic material, which is cast in a mold and is so constructed and arranged as to provide a structure of maximum strength and utility. Each said disc section comprises a base having lateral extensions reinforced by vertically disposed flange portions, and a pair of outwardly expanding wedge-shaped filter section leaves spaced from one another on said base. The outer faces of said filter section leaves are formed as suction areas, and are in substantially parallel relation. Reinforcing walls are provided, disposed in planes radiating from said base, to form a rigid filter section including said base.

The illustrated disc filter assembly is particularly constructed and arranged to provide an evenly distributed and efficient suction against all portions of the several filter screen areas making up the filter assembly.

Specifically in accordance with the invention each filter disc suction area provided in the respective filter sections is formed with radially extending grooves which are of increasing depth toward the base of the filter section to provide grooved conduits of correspondingly increasing cross-sectional area which connect with an exhaust throat passageway through the base. Each groove is open to the filter screen along its length. By gradually increasing the depth of each groove toward the base, the cross-sectional area of each groove is thus increased in accordance with the volume of air and of liquid passing therethrough to maintain a substantially even exhaust pressure on the overlying filter screen.

Another feature of the invention consists in the construction and arrangement of the discharge conduits which extend longitudinally of the central supporting core of the disc assembly each such conduit being connected along its length with a correspondingly placed disc filter section in each of the several sectioned disc filter units along the length of the core, each conduit being connected at its discharge end into a suction manifold adjacent to one end of the core. In the illustrated construction each of the discharge conduits referred to is tapered in a direction to provide a conduit of increasing cross section in the direction of discharge, so that additional capacity is provided which corresponds with the increased demands upon the conduit posed with each added disc filter section connection thereto.

Another feature of the invention consists in the improved structural arrangement of the core assembly including associated discharge conduits. In the illustrated form of the invention the core assembly comprises a tubular structure made up of a series of longitudinally extending plates Z-shaped in cross section and circularly arranged about a central axis. The Z-shaped plates are supported at intervals along their length by means of transverse frames or brackets and at each end are mounted upon short axially disposed bearing shafts on which the entire core assembly is mounted to turn. The Z-shaped plates are fitted together to form a series of discharge conduits.

Other features relate to improvements in the construction and arrangement of the exhaust and air intake manifolds by means of which an air suction is applied to the several exhaust conduits and filter disc sections associated therewith during that portion of the revolution of any specified disc filter section when said filter section is submerged in the slurry bath, and by means of which each said disc filter section is subjected to atmospheric pressure during that portion of the revolution of said disc filter section when said filter section is out of the bath to remove a deposited layer of material, referred to as a filter cake, from the suction screens.

The several features of the invention will be readily understood by one skilled in the art also from the following description taken in connection with the accompanying drawings in which:

FIG. 2 is an end view looking from the right of substantially the parts shown in FIG. 1, with reference particularly to the drive for the filter assembly and the arrangement of the sectioned disc filters indicated in dotted lines;

FIG. 3 is a vertical section taken on line 3—3 of FIG. 1 to illustrate particularly the devices for peeling off the deposited layers of material (the filter cake) from the sectioned filter screens;

FIG. 4 is an enlarged detail view looking from the left of the mechanism for controlling the movement of one of the sprays by means of which the suction screen is kept clean;

FIG. 5 is an enlarged detail view in side elevation of one of the disc filter sections, a portion of the filter screen being broken away to show the arrangement of underlying grooves;

FIG. 6 is a sectional view taken on a line 6—6 of FIG. 5 with an intermediate portion of the disc filter section having been broken away; this figure illustrating the arrangement of the filter leaves projecting upwardly from the base and illustrating also the increasing depth or taper of the grooves in a direction toward the base of the filter section;

FIG. 7 is a detail sectional view taken on line 7—7 of FIG. 6;

FIG. 8 is a sectional plan view taken on a line 8—8 of FIG. 5;

FIG. 9 is a view in perspective of one of the Z-shaped plates which are assembled to form the plurality of discharge conduits grouped about the axis of the disc filter core assembly;

FIG. 10 is an exploded view in perspective of the lower or base portion of the disc filter section as shown for example in FIGS. 7 and 8 together with the arrangement of the Z shaped plates and their supporting outside flanges to form the discharge conduits grouped around the axis of the filter core assembly;

FIG. 11 is a detail sectional view taken on a line 11—11 of FIG. 1 and also of FIG. 12 illustrating particularly the relationship of the exhaust section manifold and the associated air intake manifold introducing atmospheric pressure to the several connecting discharge conduits carried by the core of the filter assembly;

FIG. 12 is a sectional view taken on a line 12—12 of FIG. 11;

FIG. 13 is a detail sectional view taken on a line 13—13 of FIG. 11 and illustrating particularly the end of one of the discharge conduits grouped around the core axis and the air intake manifold in abutting relation thereto; and FIG. 14 is a detail sectional view taken on a line 14—14 of FIG. 11 showing particularly the connection to atmosphere from said air intake manifold.

Figure 1:
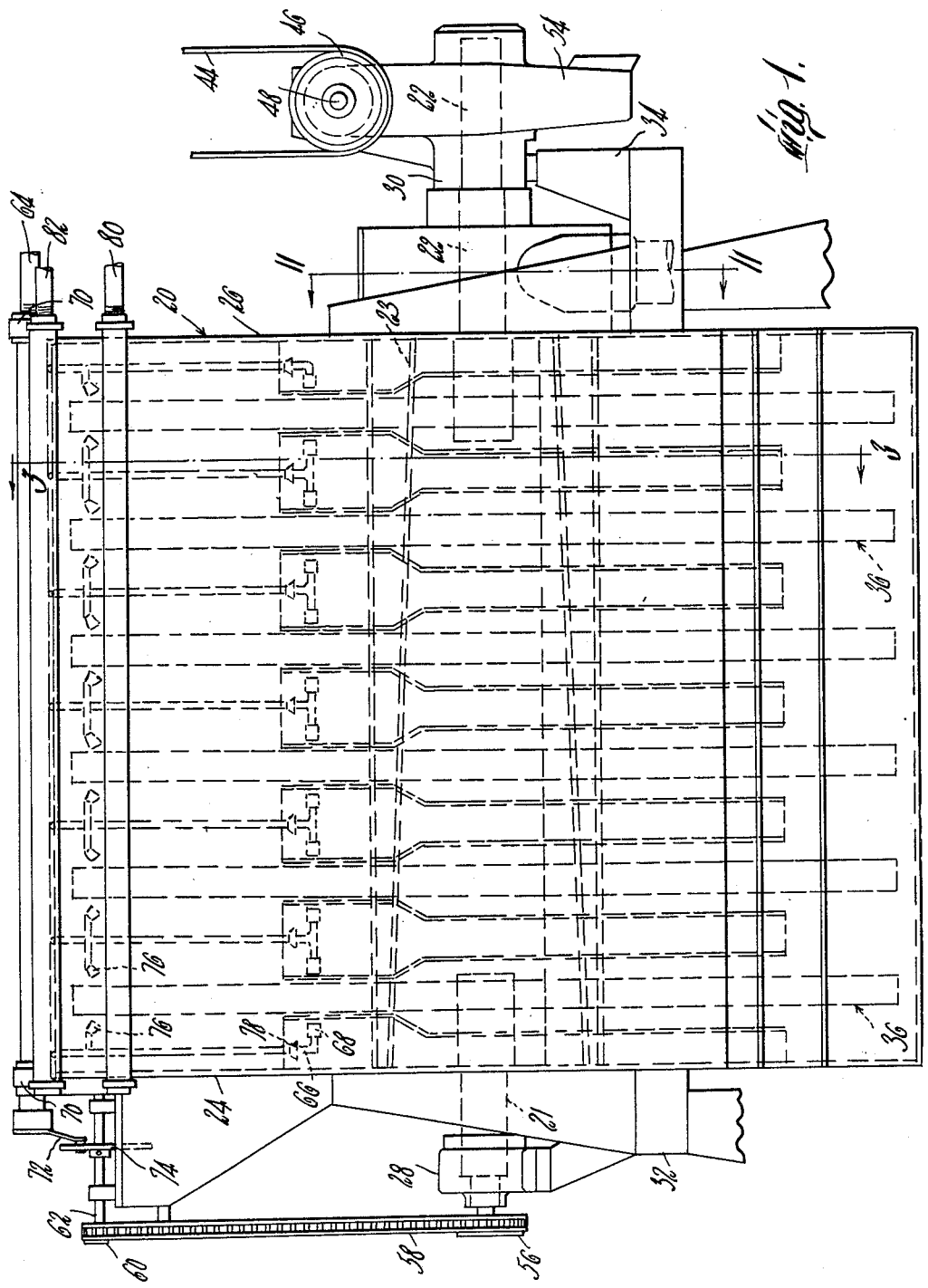
FIG. 1 is a view in side elevation of a rotary disc filter with underlying parts shown in dotted lines to illustrate particularly the arrangement of the slurry containing bath, the disc filter assembly and devices for peeling off layers of material deposited on the filter screens of the sectioned disc filter.

The disc filter illustrated in the drawings as embodying in the preferred form the several features of the invention comprises a slurry containing bath 20 in which is mounted a rotatable disc filter assembly comprising a core assembly 23 including at the ends thereof short shafts 21, 22 on which said core assembly is mounted to turn. Said bearing shafts 21, 22 extend through end walls 24, 26 of the bath 20 and are mounted to rotate in bearings 28, 30 carried on external bearing supports 32, 34. Along the length of the core assembly inside the bath are mounted a series of sectioned disc filters generally indicated at 36 in FIG. 1. The slurry bath 20 is provided further at the left hand side as shown in FIG. 2 with a series of chutes 38 which are disposed between the adjacent disc filters, and externally of the two end disc filters of the series to receive the filter cake which is peeled off from the sectioned screen surfaces of the disc filters during operation. As generally indicated in FIG. 2 each of the chutes of FIG. 3 extends upwardly above the level of the slurry so that the liquid is excluded therefrom. Each chute at its lower end is provided with an opening which connects with a stock discharge area 40. An extension 42 of each chute extending over the top of the core assembly 23 assists further to collect the filter cake peeled off from the suction filter screens of the several filter sections as they moved to a vertical position by the continued rotation of the filter assembly.

The core assembly 23 is continuously driven in a clockwise direction as shown in FIG. 2 through driving connections which include a drive belt 44 which rides over a driven pulley 46 on a transversely extending worm drive shaft 48. A worm 50 on the shaft 48 engages with a worm gear 52 secured to an outer end of the core assembly 23. The driving connections above described including the worm gear and shaft are mounted within a housing 54 carried by the bearing support 34. In the illustrated construction there is provided an additional driving means for moving back and forth one of the jets or showers which is used for cleaning the filter screen. The shower is moved back and forth at a varying rate in order to apply an equal amount of water to all portions of the rotating filter screen. Said shower driving means comprises, at the opposite end of the core assembly from the drive above described, a sprocket 56 and sprocket chain 58 which passes around the sprocket 56 and around a sprocket 60 fixed to a short cam shaft 62. The movable jet referred to, as indicated in FIGS. 1 to 4 inclusive, comprises a water supply pipe 64 which extends overhead along the length of the filter assembly and is provided at intervals with downward extensions 66 each equipped with a jet spray 68, one such extension and spray being provided for each filter face of each disc filter 36. The supply pipe 64 is rotatably supported in bearings 70 and is provided at its left hand end as shown in FIG. 1 with a cam follower arm 72 which engages a cam 74 on the cam shaft 62. It will be noted that for each side of each disc filter 36 there is provided in addition to the jet spray 68, a stationary jet spray 76 which is directed against the outer edge of the layer of filtrate on the filter screen in order to peel the filtrate layer therefrom, and a stationary jet spray 78 which is directed against the upper end of the chute extension 42 in order to assist in moving the peeled off filter cake through its chute 38 into the stock discharge area 40 of the device. Each of the jet sprays 76 is connected to a supply pipe 80, which extends overhead along the length of the filter assembly. Similarly each of the jet sprays 78 is connected with a supply pipe 82 which is mounted to extend overhead along the length of the filter assembly. Operation of the several jet sprays 68, 76, and 78 above described will be set forth more fully in connection with the description of the operation of the disc filter.

Each disc filter 36 is built up of 18 disc filter sections 90 which are rigidly secured in closely abutting relation to the core assembly, hereinafter more fully described. Each disc filter section 90 is molded as a unit from a plastic material. It will be understood that any suitable plastic may be employed having the requisite acid resisting qualities, strength, and durability. In accordance with the invention the disc filter section is so constructed and shaped as to provide a structure of maximum strength and utility. Each said disc section as shown in the drawings comprises a base 92 having lateral extensions or feet 94 which are reinforced by flanges 96 and an additional cross piece 98 (see FIG. 5). Extending outwardly from the base are a pair of outwardly expanding wedge-shaped filter section leaves 100. Said leaves are spaced from one another longitudinally of the rotational axis and are connected in said spaced relation by means of transverse walls 102 which extend outwardly from the base to the outer periphery of the filter section 90. The outer faces of said filter section leaves 100 are formed as section areas which are covered by filter screens 104 and are in substantially parallel relation to one another. It will be noted further that the inner faces of said leaves converge toward one another toward the base 92.

The suction areas of the respective filter section leaves covered by filter screens 104 are provided with radially disposed grooves 106 which, as best shown in FIG. 6 of the drawings are tapered in a direction to provide grooves of increasing depth and correspondingly increasing sectional area toward the base of the filter section. Each of the filter sections is further provided at intervals with transverse grooves 108 which cut across the radially extending grooves 106 to insure a free flow of air and of liquid from the suction area of the filter section. At the inner or base end of the filter section each of the grooves 106 is connected into an exhaust passageway 110 in the base 92. The passageway referred to is connected with both grooves and is sealed off from the space between the leaves by a transverse wall 112 (see FIG. 6).

In accordance with the invention as shown in FIGS. 2, 3, and 5 the left hand or trailing edge 114 of each disc filter section 90, assuming a clockwise direction of rotation, is swept backwardly beginning with its point of attachment with the core assembly. With this arrangement as shown in FIG. 3 the trailing edge of the filter disc section with its rising movement reaches a horizontal position at a point which is substantially above a horizontal plane passing through the axis of the rotation of the core bearing assemblies 21, 22. In the operation of the filter it is of considerable advantage to adjust the level of the bath so that the trailing edge of each individual filter section will leave the surface of the bath all at the same instant. This provides a sharp, clean-cut, cut-off point beyond which the operation of the suction to deposit the layer of filtrate on the filter screen is terminated, and at which the operation of peeling the layer of filtrate from the filter screen may be started. With the illustrated construction applicant is enabled to substantially increase the depth of the slurry bath to a point above the axis of rotation of the core assembly on bearing shafts 21, 22 at which the trailing edge of each filter section reaches said horizontal position. See, for example, the position shown in FIG. 3 of the drawings. With the swept back arrangement shown, it is thus possible to substantially increase the amount of time in which the build-up of the filter cake may be continued during each successive revolution of the disc filter assembly, and at the same time to provide a definite cut-off point at which the operation of peeling off the filter cake may be started.

The back swept shape of the filter sections is of advantage also to provide more favorable conditions for the application of a suction and the building up of a filter cake on the filter screen when the filter section is again submerged in the slurry bath. The base portion of the filter section enters the bath followed by the more outward portions thus substantially increasing the time taken for submergence, and correspondingly increasing the time during which the filter section is being filled with liquid. There is as a result, less tendency of the apparatus to suck air when the suction is applied.

The core assembly 23 of the illustrated apparatus comprises the core bearing shaft 21, 22, and, associated therewith, a number of longitudinally extending discharge conduits 120 which are grouped around the core axis and provide an alternatively available vacuum exhaust, and atmospheric pressure supply passageway between each individual disc filter section and a vacuum exhaust manifold and an associated atmospheric pressure inlet manifold disposed at one end of the slurry bath. The number of discharge conduits corresponds with the number of disc filter sections provided for one disc filter unit, eighteen such discharge conduits 120 being provided grouped about the core axis in the preferred embodiment of the invention shown.

The discharge conduits 120 are made up of a series of plates 122, each having a Z-shaped cross section as best shown in FIGS. 9 and 10. The plates are slightly arcuately shaped transversely and are fitted together to form said series of conduits 120. The plates 122 are welded together and are further supported by a series of discs 124 the end ones of which are in turn fastened to the short bearing shafts 21, 22, thus providing a rigid rotatable core assembly. Referring specifically to FIG. 9, each of the plates 122 has formed therein a series of six cutouts 126 (see FIG. 9) which provide ports connecting with the passageways 110 in the base of each disc filter section 90. The several plates 122 forming the discharge conduits 120 as above noted are welded rigidly together to form a solid core assembly. An external frame 128 consisting of two annular straps 130 and cross pieces 132 mounted on the core assembly at the location of each filter section assembly along the length of the core serve to fully enclose the passageways provided through said discharge conduits 120, ports 126, and passageways 110 to the respective disc filter section exhaust areas. The individual disc filter sections 90 are rigidly secured to the straps 130 by means of machine screws 134 threaded into the straps 130. The construction described is such that each discharge concuit 120 is connected with each of the six disc filter sections 90, one from each filter unit 36 which occupy the same angular position on the core along the length of the rotatable core assembly.

In the illustrated construction each of the plates 122 is formed with a tapered inwardly extending wall so that a discharge conduit 120 of increasing cross sectional area is provided in the direction of discharge toward the manifold at one end of the slurry bath 20. With this construction, it will be understood that additional capacity is provided along the length of the discharge conduit 120 which is well able to take care of the increased demands upon the conduit which result from the addition of each successive disc filter section thereto.

The construction of the core assembly above described including the Z-shaped plates 120 has been found to provide an extremely rigid and at the same time simple construction which is particularly suited for the formation of tapered discharge conduits while maintaining a substantially constant diameter of said core assembly.

Provision is made for applying an exhaust suction through discharge conduits 120 from the several filter sections while each of said sections is submerged in the slurry bath, and for substituting a normal atmospheric pressure to facilitate the peeling off of deposited filter cake from the filter screen 104 when the filter sections 90 have moved out of the slurry bath 20. The suction device referred to comprises an exhaust manifold in the form of a housing 136 which is connected to one end wall 26 of the slurry bath 20, and through which the end of the core bearing shaft 22 is projected. The relatively stationary housing 136 is provided at its inner end with an inwardly flanged sealing surface 137 which overlies the cylindrical surface of the core assembly provided by discharge conduits 120 and is in nearly abutting relation to a sealing ring 139 secured to said core assembly. A strap 138 provides a seal for said nearly abutting surfaces to prevent leakage of fluid from the slurry bath indirectly into the exhaust manifold 136. A heavy construction line has been added to FIG. 12 to show the line of demarcation between the (end of the) rotating core assembly and the stationary parts adjacent thereto including the housing 136 and associated partitioning walls hereinafter described. The housing 136 is connected at its outer end by means of a seal 140 with a reduced end portion of the core pivot shaft 22 to prevent any leakage between atmosphere and the exhaust manifold at this point. With this arrangement all of the exhaust conduits except for those connected to atmosphere as hereinafter set forth are open directly into the exhaust manifold 136 so that a continuous and evenly distributed vacuum is produced which acts through the several discharge conduits above described.

An exhaust suction is applied to the suction areas of the respective disc filter sections through the exhaust manifold 136 by means of two exhaust pipes 142, 144 which, as best shown in FIG. 2 are connected respectively through exhaust ports 146, 148 into the bottom of the exhaust manifold 136 at opposite sides of the core shaft 22. The exhaust manifold 136 is divided into two sections by means of a vertically disposed damper 150 which fills in the entire area of the manifold below the core pivot shaft 22 and is supported on an annular strap 152 mounted to turn on a sleeve bearing 154 forming part of the seal 140 for core pivot shaft 22. The damper 150 is adapted to be shifted to one side or the other of the exhaust manifold 136 by means of a control rod 156 which is provided at its inner end with a botton 158 which engages within a slotted bracket 160 secured to one side of the damper 150. Toward its outer end the control rod is threaded through a stationary nut 162, and is fitted with a hand wheel 164. With this arrangement rotation of the control rod 156 operates to shift the damper as desired in one direction or the other on its sleeve bearing 154. The filtrate which passes through the filter screens gradually changes in character as each sector in turn moves through the cake precipitating portion of its cycle. The filtrate drawn from one side of the exhaust manifold will be cloudy whereas that drawn from the opposite side will be relatively clear. The proportions of one to the other will depend upon operating conditions. The damper adjustment seeks to divert all of the cloudy filtrate into one exhaust conduit and all of the clear filtrate into the other exhaust conduit.

In addition to the exhaust manifold 136 above described, there is also provided an inlet manifold 166 through which air at atmospheric pressure is supplied to those discharge conduits 120 and associated disc filter sections 90 which are out of the bath and from which the collected filter cake is being removed. The inlet manifold is generally arcuate in shape being secured by means of a bracket 168 to a portion of the seal 140 above described.

At each end of the inlet manifold 166 there is provided a blank which has the effect of momentarily shutting off the discharge conduits 120 from both exhaust and atmosphere. The blank 170 provided at the left hand end of the inlet manifold 166 (FIG. 11) has the effect of definitely cutting off the suction before each suction conduit is opened to atmosphere, and the blank 172 provided at the other end of said inlet manifold similarly cuts off the conduit to atmospheric pressure before the suction is again applied.

The operation of the improved disc filter shown will be briefly described as follows:

Slurry is supplied to the slurry bath 20 through an inlet conduit 180 and control tank 182 which acts to maintain the bath at the desired level which, as shown in FIG. 3, is substantially above the axis of the core assembly. The means associated with the control tank 182 for maintaining the level of the slurry bath is diagrammatically indicated in FIG. 2 of the drawings by means of a box 183 entitled "Level Control Means." Inasmuch as control devices of this description are well known, and since the specific type of control device employed is immaterial to the invention, no further illustration or description thereof is included herewith. The filter disc assembly is continuously rotated from the driving connections including belt 44, worm 50 and worm gear 52. A suitable air suction is continuously applied to the exhaust manifold 136 through the exhaust pipes 142, 144. The air inlet manifold 166 is at all times open to atmosphere through its inlet pipe connection 184.

As the disc filter assembly rotates in the clockwise direction causing the disc filter sections connected with each discharge conduit to be successively immersed in the slurry bath the end of the discharge conduit 120 passes out of alignment with the inlet manifold 166 into engagement with the blank 172 thus shutting off the connection to atmosphere, and then into alignment with the exhaust manifold chamber 136 so that a suction is applied to the suction areas including the suction screens 104 of the respective disc filter sections. This suction is evenly applied over the entire area of the screen owing to the use of radial slots which are tapered to have an increasing cross sectional area toward the base of the slot.

The arrangement is such that the increase in cross sectional area substantially compensates for the increase in volume of air and liquid passing along different portions of the slot. Similarly a suction of substantially the same value is maintained through each of the disc filter sections connected with each respective discharge conduit by means of the tapered arrangement of the discharge conduits, which are constructed to have an increasing cross sectional area toward the discharge end of the conduit.

As the rotation of the disc filter assembly continues, a coating of material is gradually built up on the filter screens of the associated disc filter sections until that point is reached when the following edge of the disc filter section becomes parallel to and is lifted out of the slurry bath. At this point in the cycle the discharge end of the discharge conduit 120 moves into engagement with the blank 170 thus shutting off the connection to exhaust. Continued rotation of the disc filter assembly causes the discharge conduit 120 now to be connected with the atmospheric pressure through the inlet manifold 166 so that the layer of filter cake collected on the filter screens can be removed therefrom. The screens at the same time come into the field of operation of a stationary jet spray 76, which acts to assist in peeling said layer of material from the screens. The removed filter cake is allowed to fall into the chutes 38 whence it is directed into a stock discharge area 40. An additional spray 78 directed against the chute extension 42 assists in washing the filter cake through the chute 38 into the stock discharge area 40. During the continued rotation of the disc filter assembly the filter screens are arranged to be further acted upon by a moving jet spray 68 operated by the cam 74 which causes the spray to move at a relatively slow rate as it approaches the peripheral edge of the disc filter section and at a much faster rate as it approaches the base end of the filter section. The arrangement is such as to insure that an equal amount of water is directed to all portions of the filter screen for the most efficient washing of the screen.

The invention having been described what is claimed is:

1. In a continuous disc filter having a slurry containing bath, the combination of a disc filter assembly mounted to rotate on a horizontal axis in said bath which comprises with a section disc filter, a core assembly supported to turn on a horizontal axis, an assembly of discharge conduits extending longitudinally of the shaft each comprising a series of forms each having a Z shaped cross section and arcuately formed so that a series of said members when fitted together form a series of parallel discharge conduits arcuately disposed about periphery of said shaft, each said Z-shaped form being tapered inwardly toward the axis of the core assembly along the length thereof, said taper being expanded in the direction of discharge, and an annular strap means securing said discharge conduits in place.

2. A continuous disc filter having a slurry containing bath, the combination of a disc filter assembly comprising a core assembly supported in said bath to turn in one direction on a horizontal axis, means for driving said core assembly in said one direction, means for maintaining said bath at a surface level substantially above a horizontal plane through the axis of said core assembly, a filter comprising filter sections mounted from the periphery of said core assembly, each said filter section having the following edge thereof in the direction of rotation disposed along a substantially straight line extending outwardly and swept backwardly from the radial at the point of intersection with the periphery of the core assembly whereby said following edge reaches a horizontal position at the surface level of and upon emergence from said bath, means including an exhaust manifold disposed to apply an exhaust suction to each said filter section upon submergence in said bath, and to shut off said suction upon emergence of the following edge of each said filter section from said bath, and an inlet manifold thereafter connected with each said section successively while out of said bath to facilitate the peeling off of deposited filter cake therefrom.

3. A continuous disc filter having a slurry containing bath, the combination of a disc filter assembly comprising a core assembly supported in said bath to turn in one direction on a horizontal axis, means for driving said core assembly in said one direction, a filter comprising filter sections mounted from the periphery of said core assembly, each said filter section having the following edge thereof in the direction of rotation disposed along a substantially straight line extending outwardly and swept backwardly from the radial at the point of intersection with the periphery of the core assembly whereby said following edge reaches a horizontal position in a plane parallel to and substantially above a horizontal plane through the axis of said core assembly, means for maintaining the level of said slurry containing bath at substantially the level of the higher plane, means including an exhaust manifold disposed to apply an exhaust suction to each said filter section upon submergence in said bath, an inlet manifold connected with each said section while out of said bath to facilitate the peeling off of deposited filter cake, and cut off means disposed between said manifolds to cut off said suction upon emergence of said following edge of each filter section from the slurry, and to cut off said inlet manifold from each successive filter section prior to submergence thereof in said slurry containing bath.

4. In a continuous disc filter having a slurry containing bath including end walls having shaft receiving apertures therethrough, the combination of a disc filter assembly rotatable through a filtrate depositing and filtrate discharge cycle in said bath including a core assembly having end bearing shaft portions thereof projecting from the bath, a plurality of sectioned disc filters mounted along the length of the shaft, for a filter cake collecting movement through said bath and a filter cake discharge movement out of said bath, a series of discharge conduits extending longitudinally of and disposed around said core assembly underlying and connected with said disc filter sections and having open exhaust ends disposed toward one end of said core assembly, a header mounted at one end of said bath and providing a suction manifold connecting with the open ends of each of said discharge conduits during the rotation of said disc filter assembly, an atmospheric pressure manifold supported within said header having an opening connecting with the discharge ends of said discharge conduits during the filtrate discharge portion of said cycle, a sealing device disposed between an inner end of said header and the exterior surface of said series of discharge conduits, a second sealing device disposed between the outer end of said header and a projecting end of said core assembly bearing shaft, a bearing support for said shaft outside said second sealing device, and means for continuously rotating said filter assembly.

5. In a continuous disc filter having a slurry containing bath including end walls having shaft receiving apertures therethrough, the combination of a disc filter assembly rotatable through a filtrate depositing and filtrate discharge cycle in said bath including a core assembly having end bearing shaft portions thereof projecting from the bath, a plurality of sectioned disc filters mounted along the length of the core assembly, for a filter cake collecting movement through said bath and a filter cake discharge movement out of said bath, a series of discharge conduits extending longitudinally of and disposed around said core assembly underlying and connected with said disc filter sections and having open exhaust ends disposed toward one end of said core assembly, a header mounted at one end of said bath and providing a suction manifold connecting with the open exhaust ends of each of said discharge conduits during the rotation of said disc filter assembly, an atmospheric pressure manifold supported within said header having an opening connecting with the open exhaust ends of said discharge conduits during the filter cake discharge portion of said cycle, two exhaust ports from said exhaust manifold, one exhaust port being connected into each side of said exhaust manifold for discharging filtrate from the respective sides of said manifold, a damper disposed in said exhaust manifold movable laterally providing a partition between the two sides of said exhaust manifold, and means for shifting said damper to vary the proportionate discharge through each side and exhaust port connected thereto.

6. In a continuous disc filter having a slurry containing bath including end walls having shaft receiving apertures therethrough, the combination of a disc filter assembly rotatable through a filter cake depositing and discharge cycle in said bath including a core assembly extending through said bath and having end bearing shaft portions thereof extending through said apertures, a plurality of sectioned disc filters mounted along the length of the core assembly, for a filter cake collecting movement through said bath and a filtrate discharge movement out of said bath, a series of discharge conduits from said filter sections extending longitudinally of and disposed around the portion of said core assembly within said end walls, each said discharge conduit being tapered to provide a conduit of increased cross section in the direction of discharge, a header mounted at one end of said bath surrounding said core assembly and providing a suction manifold connecting with each of said discharge conduits during the rotation of said disc filter assembly, said header having formed therein a connection with each said exhaust conduit when the disc sections associated therewith are raised from the bath, and bearing supports for said core assembly engaging said end bearing shaft portions of said core assembly beyond said end walls.

7. In a disc filter having a slurry containing bath, the combination of a disc filter assembly mounted to rotate on a horizontal axis in said bath which comprises a core assembly supported to turn on a horizontal axis, and a plurality of disc filters spaced along the length of said core shaft, each said filter comprising a plurality of filter sections disposed so that the filter sections of the several disc filters project outwardly from said core shaft at the same angles, and having filter cake screen covered suction areas and exhaust passageways therefrom, a series of discharge conduits extending longitudinally of said shaft, each discharge conduit being connected with the exhaust passageways of the filter sections along the length of the shaft occupying the same angular position with respect to the shaft, each said discharge conduit having the walls thereof shaped to provide discharge conduits of varying cross section, the walls of said discharge conduits being sloped outwardly in the direction of discharge to provide a conduit of increased cross section in the direction of discharge.

8. In a disc filter having a slurry containing bath, the combination of a disc filter assembly mounted to rotate on a horizontal axis in said bath which comprises a core assembly supported to turn on a horizontal axis, and a plurality of identical disc filters spaced along the length of said core shaft, each said filter comprising a plurality of filter sections projecting at the same radial angles from said core assembly, each filter section having a throat portion and an outwardly expanding wedge-shaped leaf structure attached to said core assembly formed with a wedge-shaped suction area comprised of a series of closely adjacent radially extending grooves tapered to be of increasing depth toward said throat portion to provide grooves of increasing cross sectional area in a direction inwardly toward said throat portion of said disc filter section, and an exhaust passageway therefrom, a series of discharge conduits extending longitudinally of said shaft, each discharge conduit being connected with the exhaust passageways of the filter sections along the length of the shaft and occupying the same angular position with respect to the shaft, each said discharge conduit being tapered to provide a conduit of increased cross section in the direction of discharge.

References Cited by the Examiner

UNITED STATES PATENTS

| | | | |
|---|---|---|---|
| 1,259,139 | 3/18 | Salisbury | 210—331 X |
| 1,510,568 | 10/24 | Sweetland | 210—327 |
| 1,804,934 | 5/31 | Hoyt | 210—331 X |
| 2,444,147 | 6/48 | Walton | 210—347 X |
| 2,464,223 | 3/49 | Genter | 210—331 |
| 2,844,255 | 7/58 | Cavenah et al. | 210—486 X |
| 2,932,402 | 4/60 | Logue et al. | 210—331 X |

FOREIGN PATENTS

| | | |
|---|---|---|
| 495,337 | 7/53 | Canada. |
| 522,102 | 3/55 | Italy. |

REUBEN FRIEDMAN, *Primary Examiner.*

FRANK W. LUTTER, HERBERT L. MARTIN,
*Examiners.*